United States Patent [19]

Frosch et al.

[11] 4,273,304

[45] Jun. 16, 1981

[54] COOLING SYSTEM FOR HIGH SPEED AIRCRAFT

[76] Inventors: Robert A. Frosch, Administrator of the National Aeronautics and Space Administration with respect to an invention of ; Pierce L. Lawing, 88 Columbia Dr., Newport News, Va. 23602; LaVerne L. Pagel, 3013 Mamelle Dr., St. Charles, Mo. 63301

[21] Appl. No.: 8,210

[22] Filed: Jan. 31, 1979

[51] Int. Cl.³ .................. B64D 37/34; B64C 1/40
[52] U.S. Cl. .................. 244/117 A; 60/730; 60/267; 60/259; 62/DIG. 5; 165/104.14; 244/163
[58] Field of Search .......... 244/59, 117 A, 163, 244/119; 62/DIG. 5, 7, 119; 165/2, 41, 42, 105, 106; 123/122 E; 60/259, 266, 267, 728, 730, 736

[56] References Cited

U.S. PATENT DOCUMENTS

| | | | |
|---|---|---|---|
| 2,943,828 | 7/1960 | Van Driest | 244/117 A |
| 2,945,653 | 7/1960 | Atkin | 244/119 |
| 2,979,293 | 4/1961 | Mount | 244/117 A |
| 3,093,348 | 7/1963 | Schelp et al. | 244/117 A |
| 3,128,601 | 4/1964 | Abild | 60/259 |

FOREIGN PATENT DOCUMENTS 2299605  1/1975  France .................. 165/105

*Primary Examiner*—Galen L. Barefoot
*Attorney, Agent, or Firm*—Howard J. Osborn; John R. Manning

[57] ABSTRACT

The invention is for a system which provides total cooling for an aircraft airframe which is designed to fly in the speed range of Mach 2 to Mach 8. The system eliminates the necessity of shielding an aircraft airframe constructed of material such as aluminum. Cooling is accomplished by passing a coolant through the aircraft airframe, the coolant acting as a carrier to remove heat from the airframe. The coolant is circulated through a heat pump and a heat exchanger which together extract essentially all of the added heat from the coolant. The heat is transferred to the aircraft fuel system via the heat exchanger and the heat pump. The heat extracted from the coolant is utilized to power the heat pump. The heat pump has associated therewith power turbine mechanism which is also driven by the extracted heat. The power turbines are utilized to drive various aircraft subsystems, the compressor of the heat pump, and provide engine cooling. This system is accomplished with a small increase in aircraft weight and a total result of a small increase in performance.

16 Claims, 3 Drawing Figures

COOLING SYSTEM FOR HIGH SPEED AIRCRAFT

ORIGIN OF THE INVENTION

The invention described herein was made in the performance of work under a NASA Contract and is subject to the provisions of Section 305 of the National Aeronautics and Space Act of 1958, Public Law 85-586 (72 Stat. 435; 42 USC 2457).

BACKGROUND OF THE INVENTION

This invention relates to a system for cooling the airframe of a aircraft designed to fly in a cruise range of Mach 2 to Mach 8. The particular system to be described has been designed for a Mach 6 aircraft which has a bare aluminum airframe. The definition of the word "bare" is that the aircraft has no shielding by, for example, high temperature resistant metals.

It is contemplated that hypersonic vehicles, or vehicles designed to fly in the Mach 6 speed range, often termed hypersonic aircraft, will utilize hydrogen as an engine fuel. Since liquid hydrogen is extremely cold, various techniques have been proposed for utilizing the hydrogen fuel as a heat sink to cool the airframe of such an aircraft. Various techniques have been suggested for circulating either the hydrogen fuel or a coolant through various passages formed in the aircraft airframe and adjacent the skin thereof and extracting the heat which is being generated by the aircraft as it travels at such a high rate of speed. Systems to date have passed the coolant or fuel which has absorbed the heat through some type of heat exchanger which removes at least a portion of the heat from the fuel or coolant.

Prior art devices; however, have not been shown to have a design capability such that the entire heat generated by the aerodynamic heating of the aircraft airframe can be totally or adequately disposed of. As a result, the aircraft cooling procedure must include not only an active cooling system as discussed above, but also some type of shielding. Shielding involves the use of high temperature metal such as titanium or stainless steel, or possibly some of the composite structures which are now available. The use of shielding is obviously undesirable for many reasons. Initially, high temperature resistant structures are very expensive compared to aluminum which has been a standard structure for aircraft for many years. Further, the use of high temperature resistant shielding materials increases the mass of the aircraft while adding no strength thereby affecting the overall efficiency of the aircraft in every respect.

From the above discussion, it is apparent that it would be extremely desirable to cool a hypersonic aircraft to temperatures which an airframe constructed of aluminum could withstand. Aluminum is a structural material which is readily available in large quantities, as opposed to a high temperature material such as titanium. Aircraft constructed of aluminum have proven high structural efficiency, and known long life fabrication characteristics.

Accordingly, it is an object of this invention to provide a cooling system for a hypersonic aircraft which is constructed from bare aluminum (i.e., no shielding being utilized).

It is a further object of this invention to provide a cooling system wherein a coolant is passed through a closed loop having passages associated with the airframe for extracting heat from the airframe.

Another object of the invention is to remove essentially all of the heat from the coolant with heat exchanging mechanism and a heat pump.

Yet, another object of the invention is to provide a cooling system having a heat pump which has associated therewith one or more power turbines, the power turbines being driven by heat energy extracted from the cooling system.

Another object of the invention is to provide a cooling system wherein the power turbines forming a part thereof are utilized to drive aircraft subsystems such as pumps, electrical systems, hydraulic systems, and mechanical systems such as gear trains.

A prime object of the invention is to provide sufficient cooling to allow removal of the heat shields with no penalty in aircraft performance.

A further object of the invention is to provide a cooling system having power turbines wherein the power turbine is utilized to drive the heat pump compressor.

Another object of the invention is to provide a cooling system wherein the power turbines thereof are utilized to drive a booster fuel pump to raise the temperature and pressure of the fuel to a point such that efficient aircraft engine operation is obtainable.

A further object of the invention is to provide a cooling system wherein the aircraft fuel system is utilized as a heat sink, for cooling the aircraft engines.

Still another object of the invention is to provide an aircraft cooling system having a heat pump with alternating condenser stages and power extracting turbines utilized to reduce system weight and increase system efficiency.

BRIEF SUMMARY OF THE INVENTION

The foregoing and other objects of the invention are achieved by providing a cooling system wherein a coolant loop having a series of passages associated with the airframe is directed through the evaporator of a heat pump and a heat exchanger. A coolant is pumped through the coolant loop and acts as a carrier for the heat generated by the aerodynamic heating of the airframe. The heat exchanger removes a portion of the heat carried by the coolant loop and transfers it to the aircraft fuel which is being pumped through the heat exchanger. The fuel is pumped from the heat exchanger to the condenser of the heat pump. The heat pump condenser has a number of stages, and a power turbine associated with the stages. The fuel picks up heat in the heat pump condenser, is expanded in a power turbine and redirected through the condenser to pick up heat and again be expanded in the next power turbine. The heat energy is thus being utilized by the power turbines the outputs of which are utilized to power the aircraft subsystems, the heat pump itself, and an aircraft engine cooling system, the remainder of the heat carried by the coolant loop is removed by the evaporator of the heat pump. This heat is pumped to the heat pump condenser and transferred by the condenser to the fuel system where it is utilized by the power turbines as discussed above. The heat exchanger and heat pump are so constructed and arranged that the cooling system will maintain the bare aluminum aircraft at a temperature such as to totally cool the aircraft without the necessity of shielding.

DETAILED DESCRIPTION OF THE PREFERRED EMBODIMENT

For purposes of illustration the invention cooling system has application to an aircraft which has the following characteristics. The aircraft is designed to cruise at a Mach number of 6. It has a modified elliptical fuselage which is approximately 100.1 meters (328.5 feet) in length, 21.8 meters (71.50 feet) high, and has a wing span of 36.1 meters (118.35 feet). It has internal fuel tankage, a gross weight of 296.1 Mg (652,800 lbm), and a range of approximately 9200 km (4,968 nautical miles). It is hydrogen fueled, being capable of carrying 108.9 Mg (240,000 lbm). The aircraft has an active cooling structure or system and is designed to fly at approximately 31.4 km (103,500 feet), with an L/D equal to 4.66. Such an aircraft might be termed a baseline aircraft and if of the prior art nature would have external shielding which would weigh approximately 5.85 Mg (12,900 lbm).

The preferred embodiment of the invention is used to actively cool such a baseline aircraft and is designed to eliminate the necessity for the external heat shielding. The cooling system is also designed to maintain the aluminum airframe structure at an average temperature of 367° K. (200° F.) the normally accepted service temperature of an aluminum structure. It is contemplated to maintain this average temperature in a cruise Mach range between Mach 2 and Mach 8.

Figure 1:
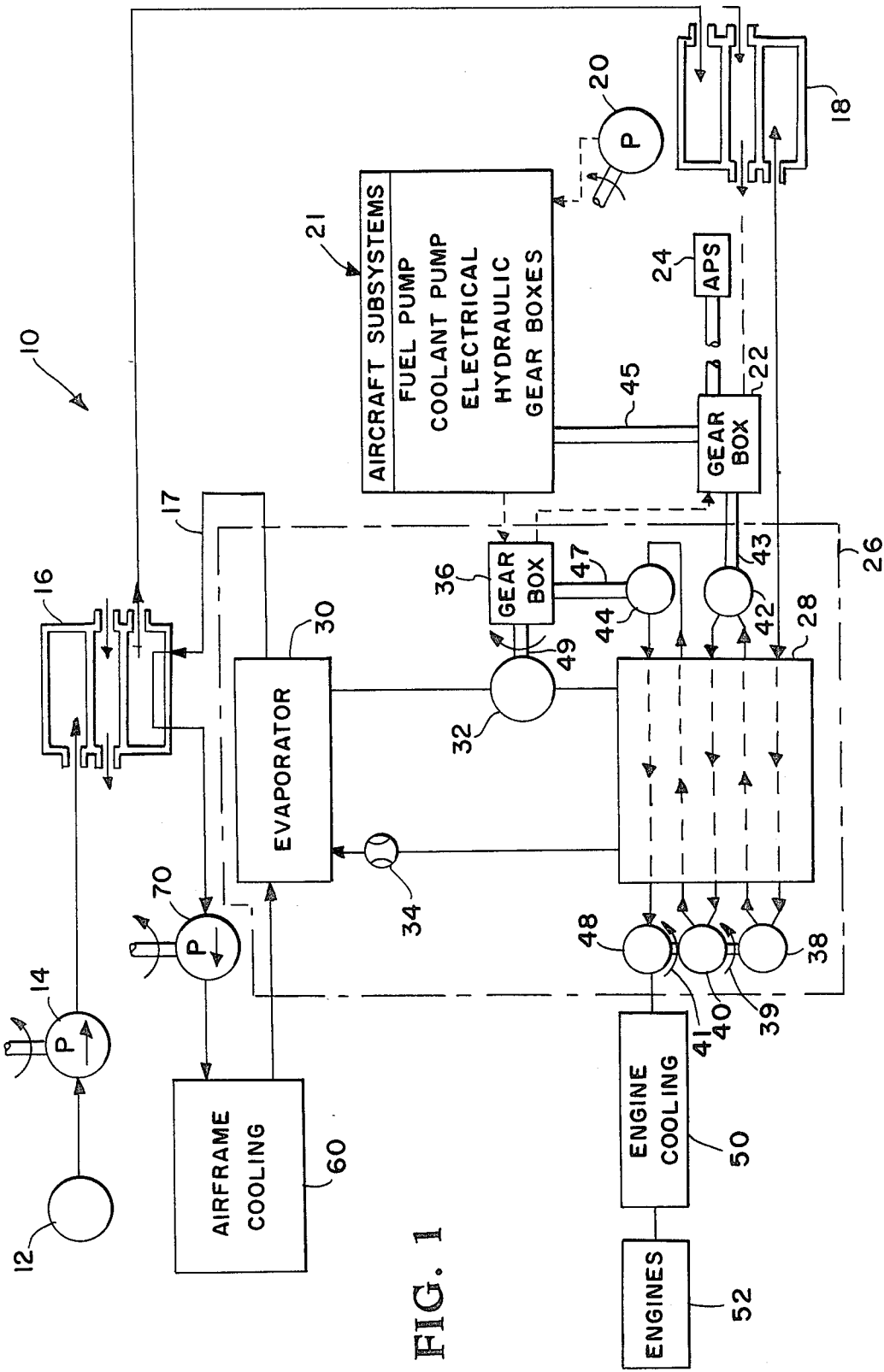
FIG. 1 is a schematic fluid flow diagram showing the cooling system for a hypersonic aircraft.

Referring now more specifically to the details of the invention, FIG. 1 shows a schematic diagram of the cooling system designated generally by the reference numeral 10. The cooling system 10 includes a fuel tank 12 which for purposes of illustration is a hydrogen fuel tank. The entire cooling system is described as utilizing hydrogen as a fuel; however, it is to be understood that the concept is not limited to the use of hydrogen as a fuel. The hydrogen fuel tank 12 is of conventional design having the necessary insulation to maintain the hydrogen in liquid form. The hydrogen is stored at a temperature of 21° K. (Kelvin) or 37° R. (Rankin), and at a pressure of 0.14 Mega Pascal (MPa) or 20 pounds force per square inch area (psia).

Although not described in detail in the cooling system, it is to be understood that in describing the invention there is conduit of conventional cryogenic fuel design to convey the fuel and the coolant between the various components of the system.

The liquid hydrogen is discharged from the hydrogen fuel tank at a mass flow rate of 13.6 kilograms per second (kg/sec) or 30 pounds mass per second (30 lbm/sec). Fuel is drawn from the fuel tank 12 by a fuel pump 14, and pumped to a heat exchanger 16. For purposes of illustration the heat exchanger 16 is of the hydrogen glycol type. The hydrogen operates as a heat sink and receives heat from the glycol which is a 60/40 mass solution of ethylene glycol and water. The heat exchanger is capable of removing 50.2 mega watts (MW) or $4.76 \times 10^4$ British thermal units per second (btu/sec). This amount of heat is transferred to the hydrogen fuel from the aircraft coolant loop to be explained in greater detail subsequently. The fuel leaves the heat exchanger 16 at a temperature of 285° K. (513° R.) and a pressure of 18.10 MPa (2625 psia).

The fuel leaves the heat exchanger 16 through appropriate conduit and moves into a subsystem cooling unit 18 which is also a heat exchanger. The aircraft subsystem is designated generally by the reference numeral 21 and includes such items as the fuel pump 14, the electrical system (not shown), the hydraulic systems (not shown). And gear boxes 22 and 36, to be described in greater detail hereinafter. The subsystem cooling is a separate cooling loop or loops illustrated diagrammatically by the dotted line in FIG. 1 which travels through the pump 20, the subsystems 21, the gear box 36, the gear box 22 and back to the heat exchanging unit 18. The pump 20 is utilized to circulate the coolant through the various aircraft subsystems. The coolant medium again may be an ethylene glycol water mixture or other coolant conventional in the prior art.

An auxiliary power system 24 is shown connected to the gear box 22 and is utilized to drive the aircraft subsystems 21 on the ground and prior to reaching a point where sufficient heat is available from the system to power the aircraft subsystems as will be explained more fully hereinafter. The auxiliary power system 24 would be driven from an independent power source of conventional design.

The fuel leaves the subsystem cooling, heat exchanger 18, and is conveyed by appropriate conduit to the heat pump designated generally by the reference numeral 26. The heat pump 26 is basically of conventional design, having a condenser 28, an evaporator 30, a compressor 32, and a throttle valve 34. The heat pump 26 uses a circulating coolant such as Freon R-11 and for purposes of this design has a coefficient of performance of 4.

The evaporator is capable of extracting heat at the rate of 40.5 MW ($3.84 \times 10^4$ btu/sec). The discharge from the evaporator is compressed by the compressor 32 and discharged to the condenser 28. The heat is removed by the condensor 28 and the throttle valve 34 controls the pumping sequence in a conventional manner. The condenser is capable of transferring 50.6 MW ($4.8 \times 10^4$ btu/sec) to the hydrogen fuel heat sink.

The heat pump 26 differs from the conventional heat pump in the condenser structure 28, in that the condenser includes several stages which are associated with power turbines in a manner now to be described. As shown in FIG. 1, the hydrogen fuel enters the condenser 28 at a temperature of 285° K. (515° R.) and a pressure of 17.79 MPa (2580 psia). After passing through the first stage of the condenser 28, the temperature has been raised to 347° K. (625° R.). The temperature differential or delta T after the first pass through the condensor of the fuel is 110° R.

Figure 3:
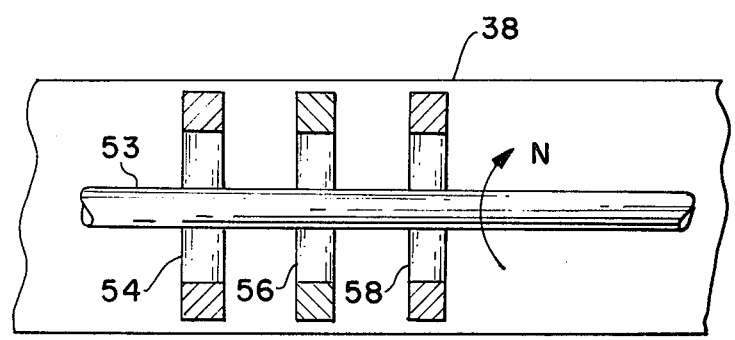
FIG. 3 is a schematic view of a power turbine utilized with the condenser of the heat pump.

The fuel is now presented to a hydrogen power turbine 38 the details of which is illustrated in FIG. 3. The details of the power turbine will be explained in greater detail hereinafter. The fuel is expanded in the power turbine 38 thereby lowering the pressure and temperature. The fuel is discharged from the power turbine 38 and passes through the second stage, the delta in the second stage being a +103° R. The fuel is discharged from the second stage of the condenser into a power turbine 42 where expansion again takes place to drive the power turbine 42. The fuel discharges from the power turbine 42 and passes through the third stage of the condenser where it picks up heat, the delta T being 81° R. The fuel is discharged into another power turbine 40. The fuel is again expanded and exits the power turbine 40 into the fourth stage of the condenser 28 where it again picks up heat there being a delta T of 82° R. The fuel discharged from the fourth stage of the condenser 28 is fed into another power turbine 44 and discharged into the fifth stage of the condenser 28 wherein a temperature increase of delta T is 81° R. The fuel exits the fifth and final stage of the condenser at a temperature of 347° K. (625° R.), and at a pressure of 2.76 MPa (401 psia). It can thus be seen that the fuel leaves the condenser at a higher temperature than it entered the condenser; however, it is now at a much lower pressure.

The fuel leaves the condenser 28 and enters a compressor serving as a fuel booster pump 48. The fuel leaves the compressor 48 at a temperature of 462° K. (831° R.), and a pressure of 6.55 MPa (950 psia).

The fuel is then further utilized to cool the engine. The engine cooling system is simply a series of passages within the engines which are illustrated diagrammatically by the reference numeral 50. Engine cooling requires the removal of 84.7 MW, ($8.03 \times 10^4$ btu/sec). After the fuel is discharged from the engine cooling system 50, it is fed to the engines which are illustrated diagrammatically by the block 52. The fuel enters the engines at a temperature of 887° K. (1,596° R.) and a pressure of 4.83 MPa (700 psia). This temperature and pressure is ideal for optimum burning efficiency in a ramjet or scramjet type engine which would be utilized to power the aircraft hereinunder consideration.

Returning to the power turbine 38, it is noted that it is connected by shaft 39 to power turbine 40, which is in turn connected by shaft 41 to the compressor and fuel booster pump 48. Thus, it can be seen that the power turbines 38 and 40 are connected in tandem and together power the compressor 48.

The power turbine 42 is connected by shaft 43 to the gear box 22. Gear box 22 has a drive train output 45 which powers the various components in aircraft subsystem 21. Power turbine 44 has a shaft 47 which drives the gear box 36. A shaft 49 is connected between gear box 36 and heat pump compressor 32 to drive the heat pump compressor.

A hydrogen power turbine such as the turbines 38, 40, 42, and 44 is illustrated diagrammatically in FIG. 3. The turbine 38 is of an axial type having a shaft 53 and three stages 54, 56, 58. From the design standpoint, the diameter of the blades are approximately 48.5 centimeters (19.1 inches) in diameter, to be driven at 24,000 rpms, giving a power output of 22.4 MW (30,000 HP).

The airframe cooling or aerodynamic heat load is illustrated by the block 60. The airframe cooling would represent a series of passages which would convey coolant by the skin of the aircraft and various elements of the aircraft superstructure. These passages would be connected to conduit which would form the coolant loop that includes the heat load 60, the coolant pump 70, the heat exchanger 16 and the evaporator 30. This loop is designated by the reference numeral 17 and the direction of flow can be seen through the various elements by the arrows shown in FIG. 1. The aerodynamic heating load produced by the aircraft structure represented by the block 60 is 90.7 MW ($8.6 \times 10^4$ btu/sec). This heat load must be absorbed by the cooling system to actively cool the baseline type aircraft having a bare aluminum structure flying in the design Mach range number. To illustrate that this has been accomplished by the invention system, the various units of temperature and pressure have been converted to horsepower and this number assigned to the various components in the diagram shown in FIG. 2.

OPERATION OF THE INVENTION

Figure 2:
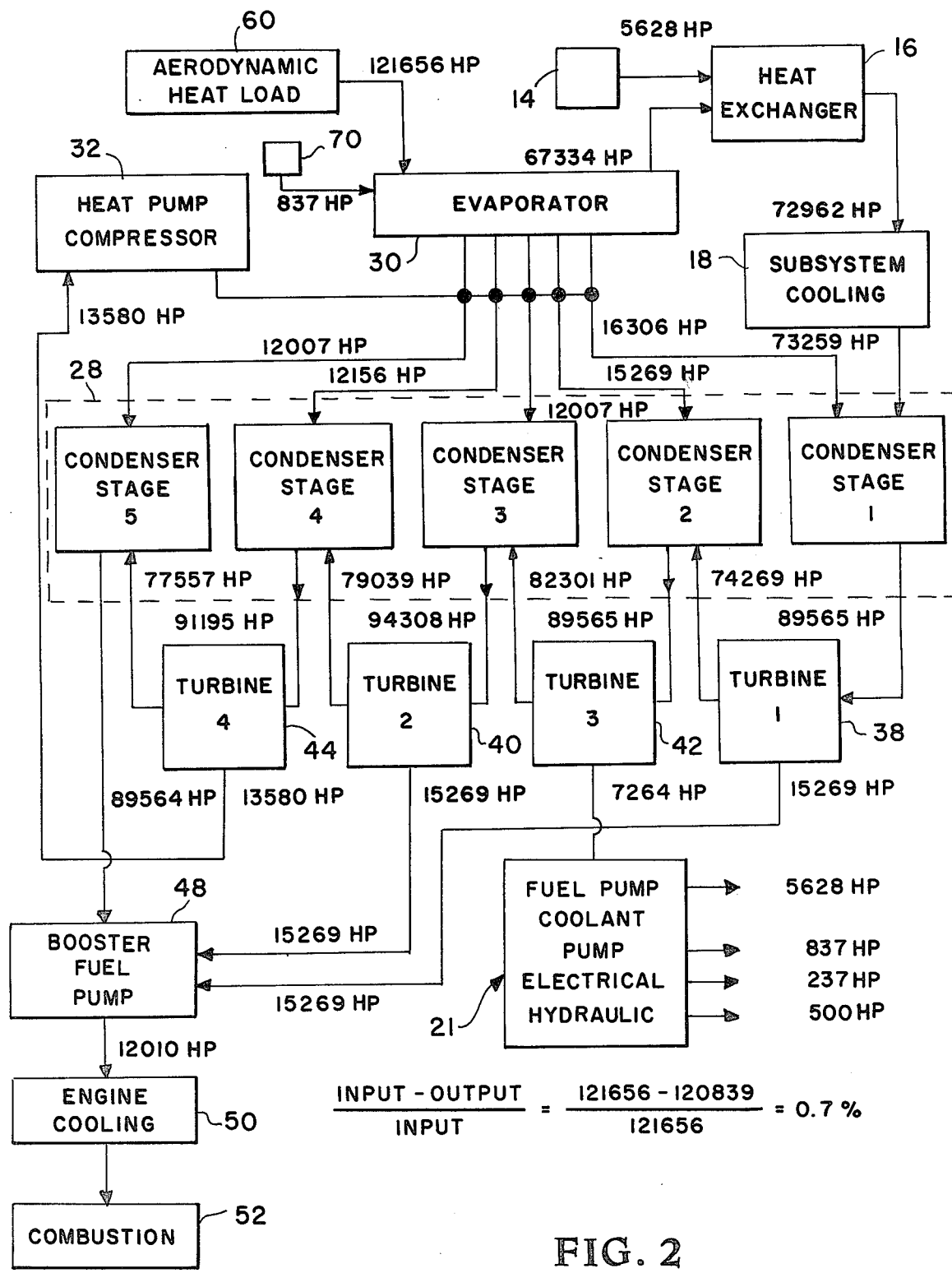
FIG. 2 is an energy flow schematic of the aircraft cooling system showing the power generated by the aerodynamic heating, how it is extracted and utilized by the cooling system.

FIG. 2 illustrates that the aerodynamic heat load 60 generates 121,656 HP at a given point in time. This heat load is dumped into the evaporator 30 of the heat pump 26. By adding the horsepowers 16,306, 15,269, 12,007, 12,156, 12,007, the respective inputs into condenser stages one through five respectively, it can be seen that a total HP of 67,745 is rejected by the condenser. It is also seen that the evaporator absorbs 54,322 and dumps 67,334 HP into the heat exchanger 16. Adding these figures (54,322 and 67,334), a total of 121,656 HP is obtained which illustrates that the cooling system totally utilizes the HP which is being generated by the aerodynamic heat load.

The system can be followed to the output of the compressor and booster fuel pump 48 where it is shown that 121,102 HP is available to the aircraft engines. This figure is obtained by adding the output from the fifth stage of the heat pump condensers and from the HP delivered to the booster fuel pump by the first and second turbines, 15,269 HP respectively. The HP utilized to run the electrical (237 HP) and hydraulic (500 HP) is added to the output from the booster fuel pump 120,102 HP, since they are not otherwise accounted for in the power utilization diagram. As shown by the equation input minus output divided by input and entering the numbers 121,656 HP minus 120,839 HP divided by 121,656 HP equals 0.7 percent, and it is illustrated that within the accuracy of the calculations, the cooling system removes the entire aerodynamics heat load generated by the aircraft.

It has been shown that when the aerodynamic efficiency of an aircraft improves, the potential of the active cooling of the structure decreases. This is due to the fact that as L/D increases the fuel requirement decreases and thus the heat sink available for cooling decreases at a faster rate than the aerodynamic heat load. The invention cooling system can compensate for this phenomenon by proper construction of the heat pump to enlarge its capacity such as adding a fifth power extraction turbine, with appropriate additional condenser stages, and making adjustments such as an increase in the fuel pump power output, and the fuel temperature. Such adjustments are believed to be well within the scope of one skilled in the art, particularly in light of the invention teachings set forth above.

Although the invention has been described relative to a particular embodiment thereof, there are obviously numerous variations and modifications readily apparent to those skilled in the art in light of the above teachings. It is, therefore, to be understood that the invention may be practiced other than as specifically described.

What is claimed as new and desired to be secured by Letters Patent of the United States is:

1. A cooling system for a high speed aircraft comprising:
   an aircraft;
   fuel means carried by said aircraft;
   said aircraft having airframe cooling means;
   heat pump means comprising evaporator and condenser means for receiving coolant medium from within said airframe cooling means and extracting heat therefrom in said evaporator means;

heat exchanger means for receiving fuel from said fuel means and receiving said coolant medium from said evaporator means and transferring heat from said coolant medium to said fuel said condenser means receiving fuel from said heat exchanger means for further heating of said fuel in said heat pump means; and, said heat exchanger means and said heat pump means arranged to maintain said airframe at low temperatures by transferring heat from said coolant medium to said fuel whie said aircraft is flying at high speeds.

2. A cooling system as in claim 1 wherein said condenser means includes power turbine means for extracting heat from said fuel, and increasing the efficiency and capacity of said sytem.

3. A cooling system as in claim 2 wherein said aircraft has subsystems including pump, electrical, hydraulic, and mechanical means;

said power turbine means being connected to and for powering said subsystems.

4. A cooling system as in claim 2 wherein said aircraft has engines;

said power turbine means driving fuel booster means for providing said fuel to the engine at pressures and temperatures necessary for efficient operation.

5. A cooling system as in claim 4 wherein said power turbine means includes a first and second power turbine connected to drive said fuel booster means.

6. A cooling system as in claim 3 wherein said aircraft has engines;

said subsystems includes a fuel booster means for providing said fuel to said engines at pressures and temperatures necessary for efficient operation; and said subsystems includes a compressor means for driving said heat pump.

7. A cooling system as in claim 6 wherein said power turbine means includes a first and second power turbine for driving said fuel booster means; and said power turbine means includes additional power turbines for driving said subsystems.

8. A cooling system as in claim 1 wherein said condenser means having a plurality of stages;

said condenser means including power turbine means for increasing the efficiency and capacity thereof;

said power turbines means including at least one power turbine connected between certain of the stages downstream thereof; said fuel passing through said plurality of condenser stages and extracting heat therefrom which is thereafter utilized as energy to drive said power turbine means.

9. A cooling system as in claim 2 wherein said aircraft is a bare aluminum aircraft; and said fuel is cryogenic.

10. A cooling system as in claim 1 wherein said coolant medium is liquid, and circulates in a closed loop.

11. The method of cooling an aircraft comprising the steps of:

providing an aircraft with an airframe coolant system;

providing an aircraft with fuel;

circulating a coolant through the airframe coolant system;

providing a heat exchanger and heat pump within the aircraft;

providing said heat pump with an evaporator means and a condenser means;

passing the coolant from said coolant system through said evaporator means and than through said heat exchanger to remove heat from said coolant;

heating said fuel by passing the fuel through the heat exchanger and than through said condenser means of said heat pump; and transferring essentially all heat absorbed from the airframe coolant system, by the coolant, to the fuel within the heat exchanger and the heat pump.

12. The method of cooling an aircraft as in claim 11, including the steps of:

dividing said condenser into stages, and locating power turbines between the heat pump condenser stages;

driving the power turbines with heat energy extracted from the fuel; and increasing the efficiency and capacity of the cooling system by converting some of the heat energy transferred by the heat pump into mechanical energy.

13. The method of cooling an aircraft as in claim 12, including the steps of:

providing the aircraft with subsystems, including pump, electrical, hydraulic and mechanical subsystems;

providing an aircraft subsystem cooling system;

powering the aircraft subsystems with output of the power turbines; and utilizing the fuel to absorb heat from the aircraft subsystem cooling system.

14. The method of cooling an aircraft as in claim 12, including the steps of:

providing the aircraft with engines;

utilizing the output of the power turbines to increase the temperatures and pressures of the fuel to enable efficient operation of the aircraft engines.

15. The method of cooling an aircraft as in claim 12, including the step of:

utilizing the output of the power turbines to drive a heat pump compressor.

16. The method of cooling an aircraft as in claim 11, comprising the steps of:

providing the aircraft with an airframe and skin; and maintaining the average temperature of the airframe and skin at 200° F. while the aircraft is flying at high speeds.

* * * * *